Patented Nov. 10, 1942

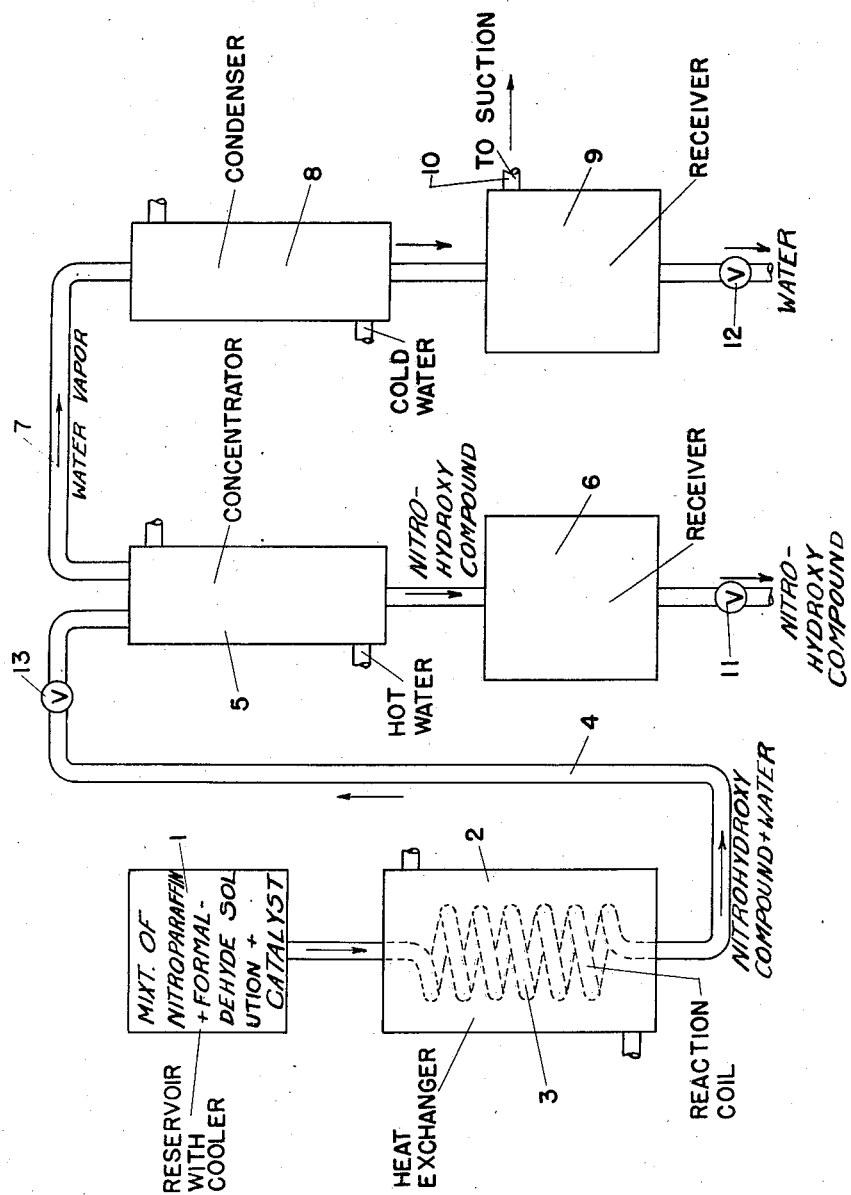

2,301,259

UNITED STATES PATENT OFFICE 2,301,259

METHOD OF PRODUCING NITROHYDROXY COMPOUNDS

Richard F. B. Cox, Wilmington, Del., assignor to Hercules Powder Company, Wilmington, Del., a corporation of Delaware Application October 25, 1939, Serial No. 301,234

8 Claims. (Cl. 260—635)

This invention relates to a method of reacting nitroparaffins with formaldehyde and more particularly relates to a continuous method of combining nitroparaffins with formaldehyde to produce nitrohydroxy compounds.

Reaction of nitroparaffins with formaldehyde to produce nitrohydroxy compounds is well known in the art. Nitromethane and nitroethane, for example, have been combined with formaldehyde to produce trimethylolnitromethane and dimethylolnitroethane respectively. In none of the processes described in the art, however, has the reaction been carried out in a continuous manner or under conditions which could be made the basis of a continuous process. The time of contact of the reactants in the prior art processes was relatively long. As a result, a large amount of tars and polymerization products were usually formed. The tarry and resinous impurities are undesirable in the nitrohydroxy compounds, since they seriously interfere in uses of the nitrohydroxy compounds, such as in nitration to produce explosive compositions. Formation of tars and polymerization products also detracts from the yield of nitrohydroxy compound.

One object of this invention is to provide a method of reacting nitroparaffins with formaldehyde in a continuous process.

Another object is to provide a method of reacting nitroparaffins with formaldehyde which provides a reaction product by very short contact of the reactants.

Another object is to provide a method of combining nitroparaffins with formaldehyde which avoids the formation of a large amount of the tars and polymerization products formed in prior art processes.

Other objects of the invention will appear hereinafter.

These objects are accomplished by passing a nitroparaffin, formaldehyde and a suitable catalyst continuously through a reactor at a temperature which will facilitate reaction.

An apparatus in which the invention may be carried out is illustrated in the drawing, in which 1 is a reservoir for holding the reactants and is equipped with suitable cooling device. The reservoir 1 is connected to heat exchanger 2 containing a reactor consisting of a tube 3 in coil form. The lower end of the reaction coil 3 is connected by line 4 to concentrator 5, which concentrates the solution of the reaction products. Concentrator 5 is jacketed and hot water is circulated through the jacket. Valve 13 in line 4 permits control of flow of the reaction mixture through the reaction coil. Concentrator 5 discharges at the bottom into receiver 6. At the top of concentrator 5 vaporized water and solvent pass through line 7 to condenser 8. Condenser 8 which condenses all material vaporized in concentrator 5, discharges at the bottom into receiver 9. Receiver 9 has an outlet 10 at which suction may be applied to maintain a vacuum in the concentrator and the condensing system and to draw the materials through the apparatus. Valves 11 and 12 on receivers 6 and 9 provide means of discharging the contents of the receivers continuously or periodically.

The nitroparaffins useful in this invention may be obtained by any of the usual methods of preparation as, for example, by direct nitration of paraffin hydrocarbons or by the reaction of an alkali nitrite with an alkyl halide, alkyl hydrogen sulfate, dialkyl sulfate or a salt of chloroacetic acid. Nitroparaffins such as, for example, nitromethane, nitroethane, nitropropane, nitrobutane, and their equivalents, may be used.

The formaldehyde may be used as an aqueous solution, preferably containing a small amount of methyl alcohol or other organic solvent to improve miscibility with the nitroparaffin. It may be an alcoholic solution of formaldehyde containing either a small amount of water or no water. It may be an aqueous or alcoholic solution of paraformaldehyde.

As a catalyst for the reaction, any of the following materials or combinations thereof may be used, such as, for example, alkali metal carbonates, bicarbonates or hydroxides, alkaline earth metal hydroxides, salts of dimethylolnitromethane, etc. The hydroxides of alkaline earth metals are preferred, since their removal from the reaction mixture is simplified by precipitation as carbonates, oxalates, sulfates, etc. The catalyst may be added to the formaldehyde solution in amount sufficient to produce alkalinity of the solution to phenolphthalein.

The process is capable of several modifications of bringing the reacting materials into the reacting zone. Thus, the nitroparaffin, formaldehyde solution and catalyst may be mixed and stored at a low temperature prior to being brought into the reactor. Alternatively, the required amount of catalyst in aqueous solution may be mixed with the mixture of formaldehyde and nitroparaffin just before the mixture is led into the reactor. As a further alternative procedure, the catalyst may be mixed with the formaldehyde solution and the mixture mixed with the nitroparaffin just before leading the entire mixture into the reactor. The latter two procedures are more preferable, since there is some danger of a violent premature reaction taking place in storing the mixture of the lower nitroparaffins, formaldehyde and catalyst.

The proportion of formaldehyde to nitroparaffin will preferably approximate the theoretical for complete combination. Thus, in the case of nitromethane, a molecular ratio of about 3 moles of formaldehyde for each mole of nitromethane is satisfactory. However, variation from the theoretical ratio is contemplated. If a deficiency of formaldehyde is employed, the reaction solution may be recirculated after removal of reaction product from it and the intermediate condensation products thereby reacted further with additional nitroparaffin and formaldehyde. Recirculation may likewise be resorted to when using the theoretical or higher ratio of nitroparaffin to formaldehyde.

Referring again to the apparatus shown in the drawing, the mixture of nitroparaffin, formaldehyde and catalyst, prepared by any of the alternative procedures described above, is drawn through the reaction coil 3 by means of suction applied at 10. The mixture entering the reaction coil is thereupon rapidly heated to a temperature of about 50° C. to about 100° C. and preferably about 80° C. to about 95° C., by means of the heat supplied by the hot water in the jacket surrounding the reaction coil and by the heat of reaction. The mixture is drawn through the reaction coil at such a rate as to provide a contact time in the reaction coil of up to two minutes and preferably of about 15 to about 30 seconds.

The solution of the nitrohydroxy compound resulting from the reaction taking place in the reaction coil is drawn away from the reaction coil through line 4 to concentrator 5 heated by hot water maintained at a temperature of about 50 to 60° C. A large proportion of the water and solvent present in the reaction mixture is vaporized in concentrator 5 and thus passes as vapor through line 7 to condenser 8 cooled by cold water, where it is condensed and drops into receiver 9, from which it may be removed either continuously or at periodic intervals through valve 12. The nitrohydroxy compound drops into receiver 6 and may be removed through valve 10 either continuously or at periodic intervals. The water collected in receiver 9 may contain small amounts of the reaction product or of uncombined reactants, which may, if desired, be recovered.

The concentrated syrup containing the nitrohydroxy compound resulting from the above treatment will contain the nitrohydroxy compound in crude form usually mixed with traces of tars and polymerization products resulting from side reactions and formaldehyde polymerization with itself. Due to the short interval of contact of the reacting materials under reaction conditions the tar and by-product formation is much less than in prior art procedures involving much longer contact time. Nevertheless, some tars and by-products are formed in the above continuous procedure. The reaction product may be treated in several ways to isolate the pure reaction product, the particular procedure used depending to certain extent on the nitrohydroxy compound involved.

By way of illustration, the reaction product of nitromethane and formaldehyde, namely, trimethylolnitromethane, produced with use of aqueous formaldehyde, may be purified by any of the following methods. Thus, the concentrated syrup of trimethylolnitromethane still containing some water may be crystallized by cooling to a temperature within the range of about 17° C. to about 25° C., whereupon crude crystals containing formaldehyde are separated. Alternatively, the concentrated syrup may be cooled to a temperature within the range of about 0° C. to about 17° C., whereupon the trimethylolnitromethane crystallizes in the form of a hydrate, from which the water is subsequently removed. In either case, the trimethylolnitromethane is separated from colored impurities and tars. Crystallization as the hydrate removes a larger amount of the color bodies and tars. The hydrate may be melted and recrystallized above 17° C. to isolate the water-free trimethylolnitromethane. Higher yields of crystals are obtained with the low temperature crystallization involving intermediate hydrate formation. Crystallization at temperatures above about 17° C. to form trimethylolnitromethane and within the range of about 0° C. to 17° C. to form a hydrate of trimethylolnitromethane is best carried out with solutions containing in the former case about 75 per cent to 85 per cent of trimethylolnitromethane and in the case of the hydrate about 30 per cent to about 70 per cent by weight of trimethylolnitromethane. Thus, for optimum results, water may be removed from the reaction mixture by evaporation or other means until a syrup containing the product in the above ranges of concentration is obtained.

As a modification of the above purification method, particularly as applied to trimethylolnitromethane, the reaction mixture before evaporation of the water may be acidified and treated with active charcoal, then filtered to remove the bulk of the color bodies. The latter are acidic and are consequently soluble in alkaline medium. On acidification of the solution, they are precipitated in amorphous condition and their removal by treatment with decolorizing charcoal is advantageous. The catalyst, if an hydroxide of an alkaline earth metal has been used, may be removed at the same time by precipitation as the carbonate, oxalate, sulfate, etc., using for example, the corresponding acid as the acidifying material in the case of the oxalate or sulfate, or by introducing carbon dioxide to precipitate as the carbonate.

In the case of trimethylolnitromethane, the crystals resulting from the crystallization with water are not free of formaldehyde. The formaldehyde may be completely removed from the crystals by drying at a temperature of about 50° C., for example in a rapidly moving current of air. For use in nitration to produce nitrated derivatives having explosive properties, the trimethylolnitromethane crystals must be further purified. For this further purification recrystallization from organic solvents such as ethyl alcohol, ethyl acetate or a mixture of ethyl acetate and chloroform are satisfactory. Trimethylolnitromethane remaining in the mother liquor may be recovered by returning the mother liquor to the reaction process.

It may be desirable to isolate a dilute solution of the nitrohydroxy compound in the process. For this purpose, concentrator 5 may be maintained at a temperature during the operation which will condense all the water and solvent and the dilute solution of nitrohydroxy compound collected in receiver 6 isolated.

The following examples illustrate the invention:

Example I

A mixture of 265 parts by weight of 36.3% by weight of aqueous formaldehyde, 61 parts by weight of nitromethane and 1.18 parts by weight of calcium hydroxide was led from reservoir 1 of the apparatus shown into reaction coil 3 and heated by heat exchanger 2 at 99° C. The mixture was drawn into the reaction coil at a rate which provided a contact time in the coil of about 25 seconds. The temperature of the reaction solution leaving the coil was 92° C. The reaction solution passed from the reaction coil through line 4 to concentrator 5 heated by hot water maintained at a temperature of about 60° C. The water vaporized from the reaction mixture in concentrator 5, was led through line 7 into the cold condenser 8 and collected in receiver 9. The concentrated reaction solution from the hot concentrator 5 dropped into receiver 6 from which the concentrated reaction solution was removed through valve 11. The reaction solution collected in receiver 6 contained 2.93% by weight of formaldehyde. The yield of trimethylolnitromethane calculated from the formaldehyde used was 97.9% of the theoretical. The operation may be continued as above without interruption by feeding further amounts of reaction mixture to the reaction coil and discharging receivers 6 and 9 periodically or continuously.

The amount of calcium hydroxide catalyst, the contact time and the reaction temperatures in the reaction coil were varied in a series of preparations similar to that described above in Example I. Details of these preparations are shown below in Table 1.

Example IX

A mixture of 244 parts by weight of 36.9% by weight of filtered aqueous formaldehyde solution saturated with calcium hydroxide at 10° C. and 61 parts by weight of nitromethane was passed through the reaction coil in the same manner as described in Example I with a contact time in the reaction coil of about 15 to 20 seconds. The temperature of the reaction solution leaving the coil was 94.5° C. The yield of trimethylolnitromethane was about 91% of the theoretical.

Example X

A mixture of 91.5 parts by weight of nitrobutane, 147 parts by weight of 35.9% by weight aqueous formaldehyde, 59 parts by weight of ethyl alcohol and 0.2 part by weight of calcium hydroxide was passed through the reaction coil in the same manner as in Example I with the temperature of the reaction coil maintained at about 100° C. and the contact time in the coil being about 70 seconds. The dimethylolnitrobutane produced was isolated from the reaction solution by evaporation of the solution and drying of the product in a current of warm air. The yield was 97% of the theoretical.

Example XI

A mixture of 75 parts by weight of nitroethane, 166 parts by weight of 36.2% by weight of aqueous formaldehyde and 0.2 part by weight of calcium hydroxide was passed through the reaction coil in the same manner as in Example I with a contact time of about 60 to 70 seconds. The reaction solution was neutralized by passing carbon dioxide into the solution, the solution filtered and evaporated to dryness. The di-

TABLE 1

| | Example | | | | |
|---|---|---|---|---|---|
| | II | III | IV | V | VI |
| Nitromethane | 61 pts. by wt | 61 pts. by wt | 61 pts. by wt | 61 pts. by wt | 61 pts. by wt. |
| Formaldehyde | 97.2 pts. by wt | 97.2 pts. by wt | 97.2 pts. by wt | 97.2 pts. by wt | 97.2 pts. by wt. |
| Ca(OH)$_2$ | 0.81 pts. by wt | 1.07 pts. by wt | 0.25 pts. by wt | 0.30 pts. by wt | 0.23 pts. by wt. |
| Heat exchanger temp | 99° C | 99° C | 99° C | 99° C | 99° C. |
| Coil exit temp | 91° C | 90° C | 95° C | 94° C | 94° C. |
| Contact time | 20 sec | 15 sec | 35 sec | 50 sec | 37 sec. |
| Ratio CH$_2$O:CH$_3$NO$_2$ | 3.24:1 | 3.24:1 | 3.24:1 | 3.24:1 | 3.24:1. |
| CH$_2$O in reaction sol | 10.2 pts. by wt | 9.5 pts. by wt | 11.8 pts. by wt | 11.4 pts. by wt | 14.1 pts. by wt. |
| Trimethylolnitromethane and yield—cal. on CH$_2$O used [1] | 97.3% | 97.9% | 95.7% | 97.8% | 93.3%. |

[1] Based on the assumption that all of the combined formaldehyde enters into formation of trimethylolnitromethane.

Example VII

A mixture of 244 parts by weight of 36.9% by weight of aqueous formaldehyde, 61 parts by weight of nitromethane and 0.4 part by weight of calcium hydroxide was treated in the same manner as described in Example I above with a contact time in the reaction coil of about 20 seconds with the exception that the temperature of the heat exchanger 2 was held at about 60° C. The calculated yield was 91–92% of the theoretical.

Example VIII

The reaction mixture described in Example VII above was led into the reaction coil heated by heat exchanger 2 at a temperature of about 99° C. with a contact time of 21–26 seconds. The calculated yield of trimethylolnitromethane was 95–96% of the theoretical.

methylolnitroethane produced was dried in a current of warm air. The yield was 91.5% of the theoretical.

In the above examples, the efficiency of the continuous operation is illustrated in terms of a unit operation. By continuing the feeding of the solutions containing the proportions of ingredients shown to the reaction coil and emptying receivers 6 and 9, continuously, a continuous and regular flow of reaction product is maintained without interruption.

The continuous process of producing nitrohydroxy compounds from nitroparaffins and formaldehyde described in accordance with this invention provides a much shorter contact time of the reacting ingredients than prior art processes and thereby avoids formation of a considerable amount of the tars and formaldehyde polymerization products usually formed in the prior art procedures. It also provides a more convenient method of producing nitrohydroxy compounds and one which is more ideally adapted to commercial production than prior art methods.

It will be understood that the details and examples hereinbefore set forth are illustrative only and that the invention as herein broadly described and claimed is in no way limited thereby.

What I claim and desire to protect by Letters Patent is:

1. The method of producing a nitrohydroxy aliphatic compound which comprises forming a mixture of a nitroparaffin selected from the group consisting of nitromethane, nitroethane, nitropropane and nitrobutane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitroparaffin with the formaldehyde in the said reaction zone.

2. The method of producing a nitrohydroxy aliphatic compound which comprises forming a mixture of a nitroparaffin selected from the group consisting of nitromethane, nitroethane, nitropropane and nitrobutane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitroparaffin with the formaldehyde in the said reaction zone, the ratio of formaldehyde to nitroparaffin being approximately the theoretical for complete combination.

3. The method of producing a nitrohydroxy aliphatic compound which comprises forming a mixture of a nitroparaffin selected from the group consisting of nitromethane, nitroethane, nitropropane and nitrobutane, a formaldehyde solution and an alkaline catalyst at a temperature sufficiently low to prevent reaction among the ingredients, passing the said unreacted mixture continuously through a small reaction zone where it is rapidly heated to a reaction temperature of about 80° C. to about 95° C. and maintaining the reactants in the said reaction zone for from about 15 seconds to about 120 seconds, thereby providing substantially complete combination of the nitroparaffin with the formaldehyde in the said reaction zone.

4. The method of producing trimethylolnitromethane which comprises forming a mixture of nitromethane, a formaldehyde solution and an alkaline catalyst at a temperature sufficiently low to prevent reaction among the ingredients, passing the said unreacted mixture continuously through a small reaction zone where it is rapidly heated to a reacton temperature of about 50° C. to about 100° C. and maintaining the reactants in the said reaction zone for from about 15 seconds to about 120 seconds, thereby providing substantially complete combination of the nitromethane with the formaldehyde in the said reaction zone.

5. The method of producing trimethylolnitromethane which comprises forming a mixture of nitromethane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitromethane with the formaldehyde in the said reaction zone, the ratio of formaldehyde to nitromethane being approximately the theoretical for complete combination.

6. The method of producing trimethylolnitromethane which comprises forming a mixture of nitroethane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitromethane with the formaldehyde in the said reaction zone, and the ratio of formaldehyde to nitromethane being about 2.75 mols to about 3.25 mols of formaldehyde for 1 mol of nitromethane.

7. The method of producing dimethylolnitroethane which comprises forming a mixture of nitromethane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitroethane with the formaldehyde in the said reaction zone.

8. The method of producing dimethylolnitrobutane which comprises forming a mixture of nitrobutane, a formaldehyde solution and an alkaline catalyst at a temperature sufficiently low to prevent reaction among the ingredients, passing the said unreacted mixture continuously through a small reaction zone where it is rapidly heated to a reaction temperature of about 50° C. to about 100° C. and maintaining the reactants in the said reaction zone for from about 15 seconds to about 120 seconds, thereby providing substantially complete combination of the nitrobutane with the formaldehyde in the said reaction zone.

RICHARD F. B. COX.

CERTIFICATE OF CORRECTION.

Patent No. 2,301,259.   November 10, 1942.

RICHARD F. B. COX.

It is hereby certified that error appears in the printed specification of the above numbered patent requiring correction as follows: Page 4, second column, line 41, claim 7, for "nitromethane" read --nitroethane--; and that the said Letters Patent should be read with this correction therein that the same may conform to the record of the case in the Patent Office.

Signed and sealed this 29th day of December, A. D. 1942.

Henry Van Arsdale,
Acting Commissioner of Patents.

(Seal)